(12) United States Patent
Orsley (10) Patent No.: US 9,128,543 B2
(45) Date of Patent: Sep. 8, 2015

(54) TOUCH PAD DEVICE AND METHOD FOR DETERMINING A POSITION OF AN INPUT OBJECT ON THE DEVICE USING CAPACITIVE COUPLING

(75) Inventor: Timothy James Orsley, San Jose, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 1135 days.

(21) Appl. No.: 12/332,515

(22) Filed: Dec. 11, 2008

(65) Prior Publication Data

US 2010/0147600 A1  Jun. 17, 2010

(51) Int. Cl.
  *G06F 3/041* (2006.01)
  *G06F 3/0354* (2013.01)
  *G06F 3/044* (2006.01)

(52) U.S. Cl.
  CPC .......... *G06F 3/03547* (2013.01); *G06F 3/044* (2013.01); *G06F 2203/0339* (2013.01); *H04M 2250/22* (2013.01)

(58) Field of Classification Search
  CPC ....... G06F 3/041; G06F 3/0412; G06F 3/044; G06F 3/047; G06F 2203/04111
  USPC .......... 345/173, 156; 178/18.01, 18.03, 18.06
  See application file for complete search history.

(56) References Cited

U.S. PATENT DOCUMENTS

| | | | | |
|---|---|---|---|---|
| 4,087,625 A * | 5/1978 | Dym et al. | | 178/18.06 |
| 4,103,252 A * | 7/1978 | Bobick | | 331/48 |
| 4,264,903 A * | 4/1981 | Bigelow | | 341/1 |
| 4,736,191 A * | 4/1988 | Matzke et al. | | 341/20 |
| 4,771,138 A * | 9/1988 | Dhawan | | 178/18.03 |
| 4,952,757 A * | 8/1990 | Purcell et al. | | 178/18.07 |
| 6,297,811 B1 * | 10/2001 | Kent et al. | | 345/173 |
| 7,019,765 B2 * | 3/2006 | Fujiwara et al. | | 347/173 |
| 7,050,927 B2 * | 5/2006 | Sinclair et al. | | 702/150 |
| 7,466,307 B2 * | 12/2008 | Trent et al. | | 345/173 |
| 7,495,659 B2 * | 2/2009 | Marriott et al. | | 345/173 |
| 7,786,981 B2 * | 8/2010 | Proctor | | 345/173 |
| 8,125,462 B2 * | 2/2012 | Lin et al. | | 345/173 |
| 8,159,467 B2 * | 4/2012 | Gray et al. | | 345/173 |
| 2005/0052429 A1 * | 3/2005 | Philipp | | 345/173 |
| 2006/0176270 A1 * | 8/2006 | Sachs | | 345/156 |
| 2006/0227117 A1 * | 10/2006 | Proctor | | 345/173 |
| 2007/0247421 A1 * | 10/2007 | Orsley et al. | | 345/156 |
| 2007/0247443 A1 * | 10/2007 | Philipp | | 345/173 |
| 2007/0257894 A1 * | 11/2007 | Philipp | | 345/173 |
| 2008/0007539 A1 * | 1/2008 | Hotelling | | 345/173 |
| 2008/0012837 A1 * | 1/2008 | Marriott et al. | | 345/173 |

* cited by examiner

*Primary Examiner* — Jason Mandeville (74) *Attorney, Agent, or Firm* — Winston Hsu; Scott Margo (57) ABSTRACT

A touch pad device and method for determining a position of an input object on the device uses multiple sensing electrodes to produce signals induced by mutual capacitive coupling that are dependent on which conductors of the device are being electrically contacted by the input object. These signals are then processed to determine the position of the input object on the touch pad device.

8 Claims, 8 Drawing Sheets

TOUCH PAD DEVICE AND METHOD FOR DETERMINING A POSITION OF AN INPUT OBJECT ON THE DEVICE USING CAPACITIVE COUPLING

BACKGROUND OF THE INVENTION

With continual increase in the number of handheld devices, such as cellular phones and media players, that are currently in use, there is a need for compact input devices to navigate through different options available on these devices. A popular input device on handheld devices is a click wheel, which is based on capacitive sensing. The click wheel includes a ring-shaped membrane with conductive channel grid (conductors) on the top surface and multiple conductive wedges on the bottom surface. The multiple conductive wedges are electrically connected to a capacitive sensing integrated circuit (IC).

In operation, current is supplied to the conductive channel grid on the top surface of the click wheel membrane. When a finger (a conductor and a path to ground) is placed on the click wheel near the conductive channel grid, current flows through the finger from the conductive channel grid near the finger, which is sensed by the capacitive sensing IC via the conductive wedges on the bottom surface. As the finger moves around the click wheel, the capacitive sensing IC detects the corresponding capacitive change, which uses this information to track the movement of the finger.

A concern with the click wheel is that each of the conductive wedges requires a pin on the capacitive sensing IC. As an example, if the click wheel has sixteen conductive wedges, the capacitive sensing IC needs to have sixteen pins to provide sixteen counts per rotation. As IC fabrication process geometries improve and logic die size decreases, realization of the associated cost reduction for the capacitive sensing IC may not be possible because of the pin count requirement for the capacitive sensing IC. Thus, the high pin count may prove to be a barrier to cost reduction.

Thus, there is a need for a lower cost input device, which can provide similar functionality of a click wheel, for use in handheld devices.

SUMMARY OF THE INVENTION

A touch pad device and method for determining a position of an input object on the device uses multiple sensing electrodes to produce signals induced by mutual capacitive coupling that are dependent on which conductors of the device are being electrically contacted by the input object. These signals are then processed to determine the position of the input object on the touch pad device.

A touch pad device in accordance with an embodiment of the invention comprises a substrate having opposing first and second surfaces, a drive conductive electrode and multiple sensing electrodes on the second surface, a plurality of conductors on the first surface, each of the conductors being positioned on the first surface such that portions of at least two of the multiple sensing electrodes are situated directly across that conductor on the second surface, a drive circuit configured to generate a drive signal, the drive circuit being electrically connected to the drive electrode to supply the drive signal to the drive electrode to generate coupling signals in the multiple sensing electrodes, the coupling signals being dependent on any electrical contact between an input object and at least one of the conductors, multiple signal measuring units electrically connected to the multiple sensing electrodes to measure the coupling signals in the multiple sensing electrodes and to produce output signals, and a processing unit connected to the multiple signal measuring units to process the output signals to determine which of the conductors is being electrically contacted by the input object to determine a position of the input object.

A touch pad device in accordance with another embodiment of the invention comprises an annular-like substrate having opposing first and second surfaces, a drive electrode and multiple sensing electrodes on the second surface, a plurality of conductors on the first surface, each of the conductors being positioned on the first surface such that portions of at least two of the multiple sensing electrodes are situated directly across that conductor on the second surface, a drive circuit configured to generate a drive signal, the drive circuit being electrically connected to the drive electrode to supply the drive signal to the drive electrode to generate coupling signals in the multiple sensing electrodes, the coupling signals being dependent on any electrical contact between an input object and at least one of the conductors, multiple signal measuring units electrically connected to the multiple sensing electrodes to measure the coupling signals in the multiple sensing electrodes and to produce output signals, and a processing unit connected to the multiple signal measuring units to process the output signals to determine which of the conductors is being electrically contacted by the input object to determine a position of the input object.

A method for determining a position of a target object on a touch pad device, which includes a substrate having opposing first and second surfaces, a drive conductive electrode and multiple sensing electrodes on the second surface, and a plurality of conductors on the first surface, each of the conductors being positioned on the first surface such that portions of at least two of the multiple sensing electrodes are directly across that conductor on the second surface, in accordance with an embodiment of the invention comprises applying a drive signal to the drive electrode of the touch pad device to generate coupling signals in the multiple sensing electrodes, the coupling signals being dependent on any electrical contact between an input object and at least one of the conductors, measuring the coupling signals in the multiple sensing electrodes of the touch pad device to produce output signals, and processing the output signals to determine which of the conductors is being electrically contacted by the input object to determine the position of the input object on the touch pad device Other aspects and advantages of the present invention will become apparent from the following detailed description, taken in conjunction with the accompanying drawings, illustrated by way of example of the principles of the invention.

DETAILED DESCRIPTION

Figure 1:
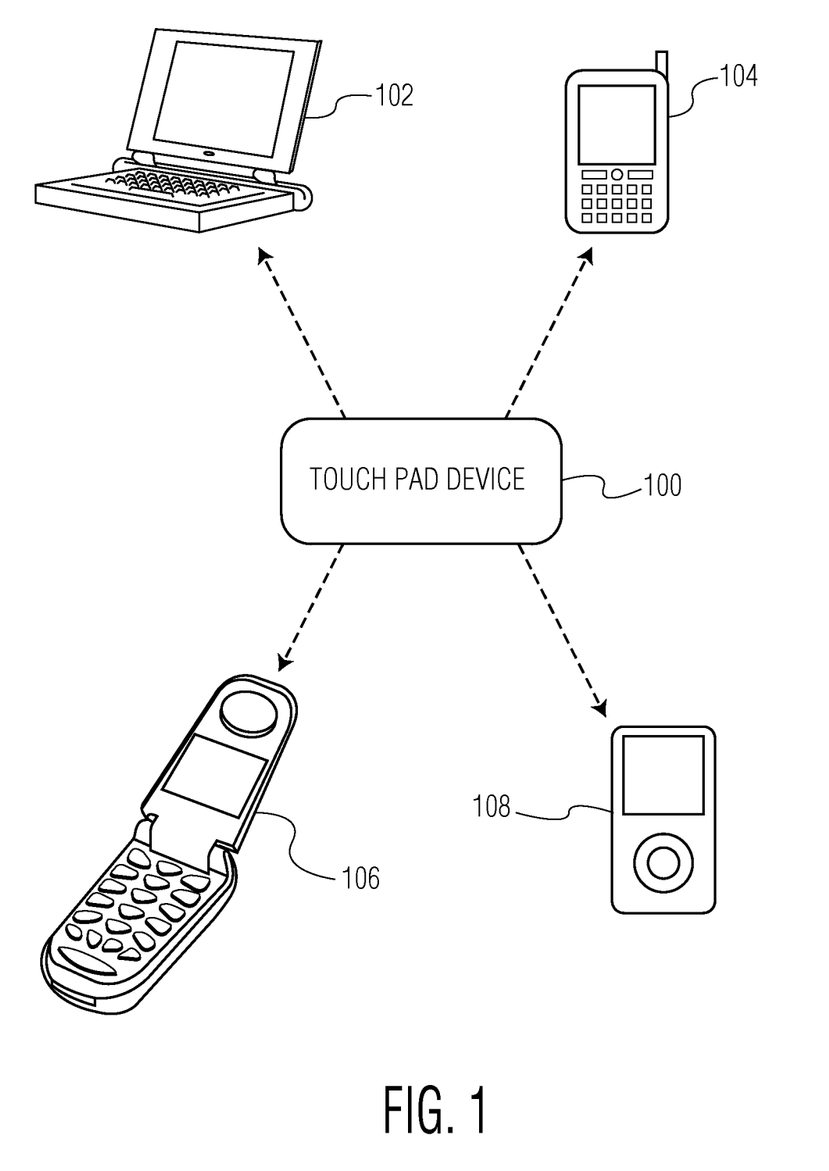
FIG. 1 shows a touch pad device in accordance with an embodiment of the invention, which may be used in various electronic devices.

With reference to FIG. 1, a touch pad device 100 in accordance with an embodiment of the invention is described. The touch pad device 100 is touch sensitive so that a user can use a finger to navigate within an electronic environment. As an example, the touch pad device 100 may be used to control a cursor displayed on an electronic screen, to move between different interactive graphic elements displayed on the electronic screen or to control a setting of a parameter control, such as volume control. The touch pad device 100 may be used as a control device in various electronic devices, such as a notebook computer 102, a personal digital assistant (PDA) 104, a cellular phone 106 and a portable media player 108, as illustrated in FIG. 1.

Figure 2:
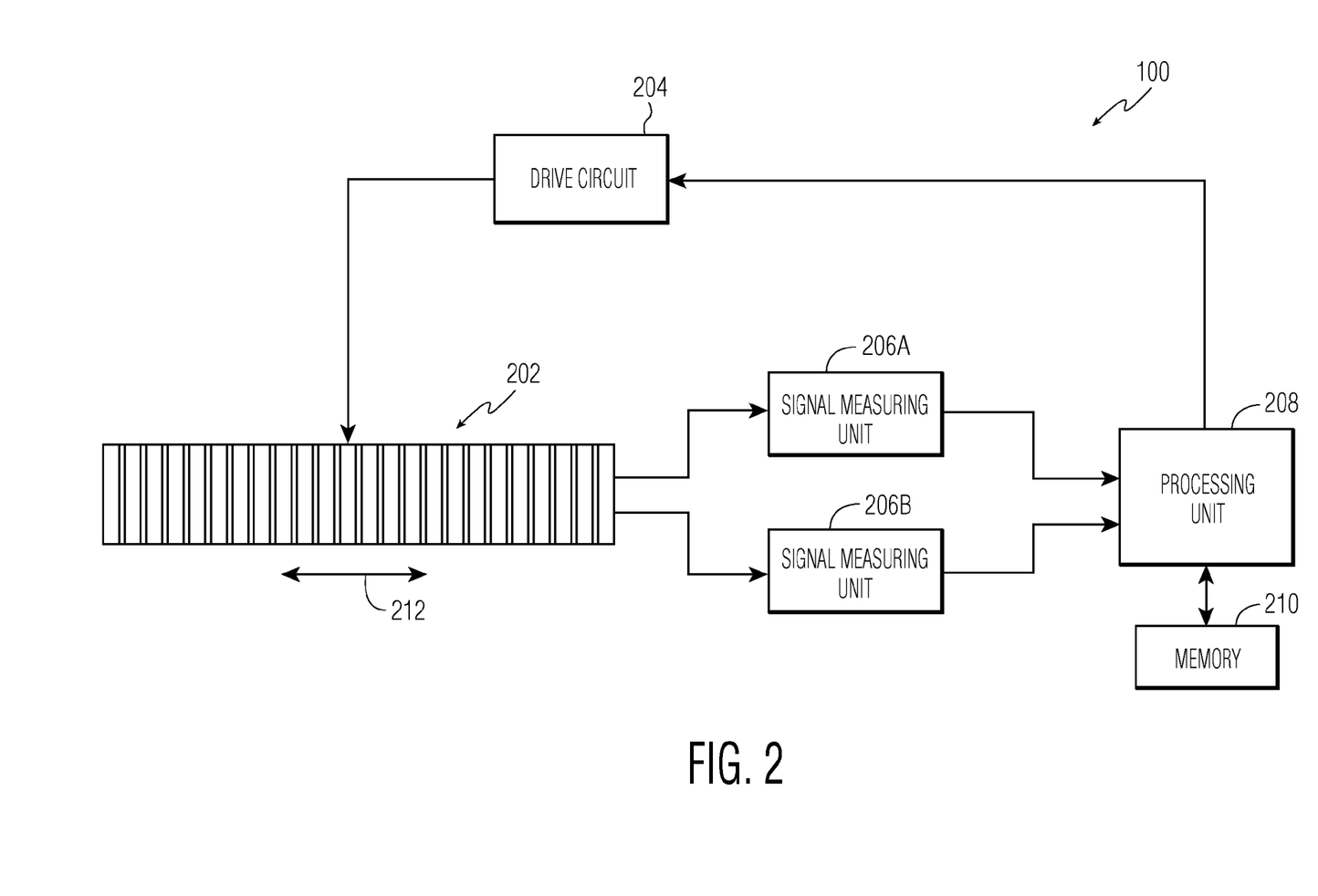
FIG. 2 is a block diagram of the touch pad device of FIG. 1.

Turning now to FIG. 2, components of the touch pad device 100 in accordance with an embodiment of the invention are illustrated. As shown in FIG. 2, the touch pad device 100 includes a touch pad 202, a drive circuit 204, signal measuring units 206A and 206B, a processing unit 208 and memory 210. Although these components are illustrated in FIG. 2 as being separate components, two or more of these components may be integrated. In this embodiment, the touch pad device 100 operates as a linear touch sensitive device such that the touch pad device is able to detect straight linear movement of an input object, e.g., a finger of a user, on the touch pad 202 along the length of the touch pad 202, as indicated by an arrow 212. However, in other embodiments, the touch pad device 100 may be modified to detect curved linear movement of the input object on the touch pad 202. As an example, in the illustrated embodiment, the touch pad device 100 may be used a volume control device.

The touch pad 202 is an electronic component that generates signals that vary depending on the position of the input object on the touch pad. Thus, the signals from the touch pad 202 can be used to determine the position of the input object on the touch pad and/or to determine the speed of the input object pad moving on the touch pad.

Figure 3A:
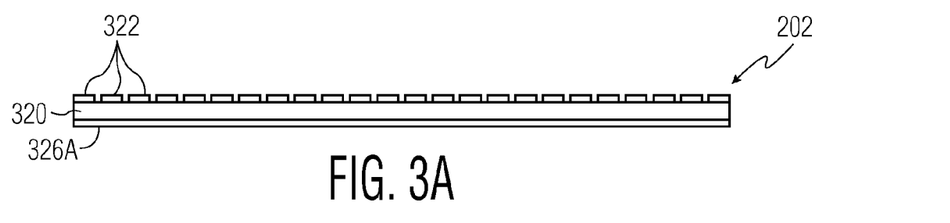
FIG. 3A is a side view of a touch pad of the touch pad device of FIG. 2.
Figure 3B:
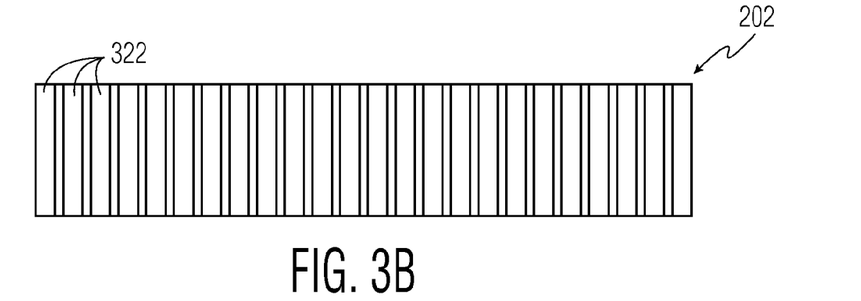
FIG. 3B is a top view of the touch pad of the touch pad device of FIG. 2.
Figure 3C:
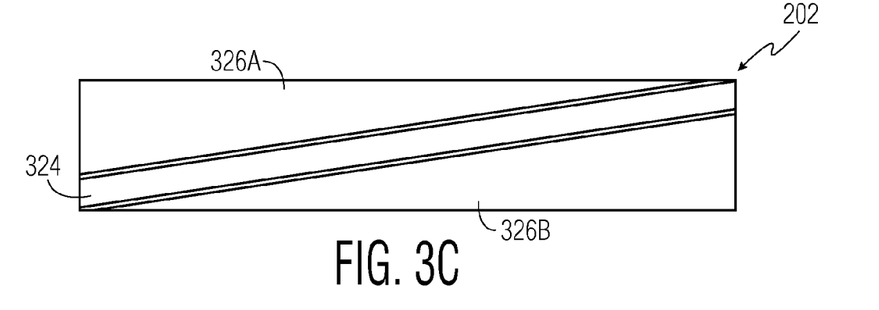
FIG. 3C is a bottom view of the touch pad of the touch pad device of FIG. 2.
Figure 3D:
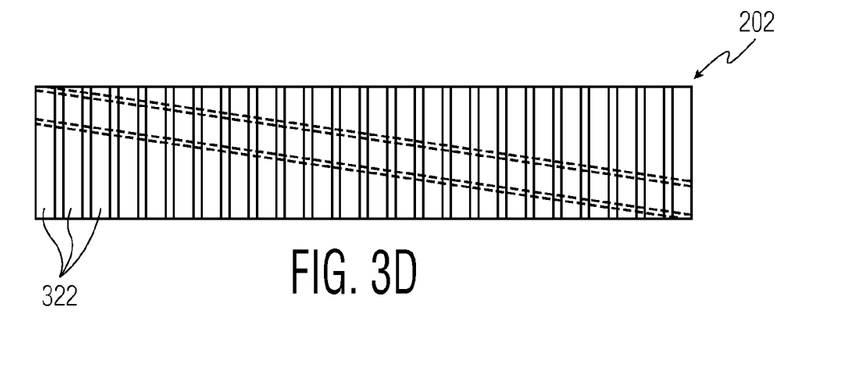
FIG. 3D is another top view of the touch pad of the touch pad device of FIG. 2 with superimposed phantom layout of the bottom view of the touch pad.

The touch pad 202 is further described with reference to FIGS. 3A, 3B, 3C and 3D. FIG. 3A is a side view of the touch pad 202. FIG. 3B is a top view of the touch pad 202. FIG. 3C is a bottom view of the touch pad 202. FIG. 3D is also a top view of the touch pad 202 with superimposed phantom layout of the bottom view of the touch pad. As shown in FIG. 3A, the touch pad 202 includes a substrate 320 having an upper major surface and a lower major surface. The upper and lower major surfaces of the substrate 320 are opposing surfaces. The upper major surface of the substrate 320 is the surface that faces toward a user, and thus, is the surface that the user electrically contacts with an input object, e.g., a finger, to use the touch pad 202. As used herein, an electrical contact may or may not be a physical contact that creates an electrical connection. In some embodiments, the substrate 320 is made of non-conductive material, such as plastic material. In some embodiments, the substrate 320 may be made of a flexible non-conductive material, and thus, the touch pad 202 may be a flex circuit.

As shown in FIGS. 3A and 3B, the touch pad 202 includes an array of conductors 322 on the upper major surface. The conductors 322 are made of conductive material, such as copper or other metals. In the illustrated embodiment, the conductors 322 are rectangular in shape. However, in other embodiments, the conductors 322 may be shaped in different configurations. The number of conductors 322 included in the touch pad 202 may vary. In the illustrated embodiment, each of the conductors 322 is physically and electrically separated from each other by spaces. However, in other embodiments, the conductors 322 may be physically and electrically separated from each other by non-conductive materials disposed between the conductors.

As shown in FIG. 3C, the touch pad 202 includes a drive electrode 324 and two sensing electrodes 326A and 326B on the lower major surface. In the illustrated embodiment, the drive electrode 324 is shaped as a conductive strip that is positioned diagonally so that the strip extends from the upper right corner to the lower left corner. In addition, the two sensing electrodes 326A and 326B are shaped as right triangles and positioned such that the drive electrode 324 is situated between the two sensing electrodes. The sensing electrode 326B is positioned below the drive electrode such that the hypotenuse side of the sensing electrode 326B is situated adjacent to the drive electrode 324 and the two right angled sides of the sensing electrode 326B are aligned with the right and bottom sides of the substrate 320, as viewed from the lower major surface of the substrate. The sensing electrode 326A is positioned above the drive electrode 324 such that the hypotenuse side of the sensing electrode 326A is also situated adjacent to the drive electrode and the two right angled sides of the sensing electrode 326A are aligned with the top and left sides of the substrate 320, as viewed from the lower major surface of the substrate. Thus, the sensing electrodes 326A and 326B are positioned on the lower major surface of the substrate 320 in a rectangular arrangement. However, in other embodiments, the drive electrode 324 and the two sensing electrodes 326A and 326B can be shaped in other configurations and positioned at other locations on the lower major surface of the substrate 320. In the illustrated embodiment, each of the drive and sensing electrodes 324, 326A and 326B is physically and electrically separated from each other by spaces. However, in other embodiments, the drive and sensing electrodes 324, 326A and 326B may be physically and electrically separated from each other by non-conductive materials disposed between the drive and sensing electrodes.

The relative positions of the conductors 322 on the upper major surface of the substrate 320 with respect to the sensing electrodes 326A and 326B on the lower major surface are illustrated in FIG. 3D. The conductors 322 are positioned on the upper major surface such that each of the conductors is situated directly across a portion of the sensing electrode 326A and a portion of the sensing electrode 326B on the lower major surface. As shown in FIG. 3D, the sizes of the portions of the sensing electrodes 326A and 326B that are situated across a particular conductor depends on the location of that conductor on the upper major surface. The size of the portion of the sensing electrode 326B situated across a particular conductor increases from the far left conductor to the far right conductor. Conversely, the size of the portion of the sensing electrode 326A situated across a particular conductor decreases from the far left conductor to the far right conductor. Thus, each of the conductors 322 on the upper major surface is associated with different sized portions of the sensing electrodes 326A and 326B on the lower major surface.

Turning back to FIG. 2, the drive circuit 204 of the touch pad device 100 is electrically connected to the drive electrode 324 of the touch pad 202. The drive circuit 204 is designed to generate a drive signal, which is applied to the drive electrode 324 to produce coupling effect in the adjacent sensing electrodes 326A and 326B through the conductors 322. As a result, a coupling signal is generated in each of the sensing electrodes 326A and 326B. In an embodiment, the drive circuit 204 is configured to generate rectangular wave drive signals, which will typically produce greater coupling in the sensing electrodes 326A and 326B. However, in other embodiments, the drive circuit 204 may be configured to generate any type of signals. The coupling signals generated in the sensing electrodes 326A and 326B change when the input object (e.g., a finger of a user) electrically contacts one or more of the conductors 322 of the touch pad 202, which provides a path to ground. Depending on which of the conductors 322 are being touched by the input object, the coupling signals in the sensing electrodes 326A and 326B will be changed according to the portions of the sensing electrodes that are across those conductors. As an example, coupling-induced currents in the sensing electrodes 326A and 326B will decrease when the input object is placed on one or more of the conductors 322 of the touch pad 202 depending on the sizes of the portions of the sensing electrodes that are situated across those conductors. Thus, the coupling signals in the sensing electrodes 326A and 326B can be used to determine the position of the input object on the touch pad 202.

The signal measuring units 206A and 206B of the touch pad device 100 are electrically connected to the sensing electrodes 326A and 326B, respectively, of the touch pad 202. Each of the signal measuring units 206A and 206B is designed to measure the coupling signal in the connected sensing electrode and produce an output signal, which is indicative of the strength of the coupling signal. In an embodiment, each of the signal measuring units 206A and 206B may include an analog-to-digital converter (ADC) to measure the coupling-induced current in the connected sensing electrode. In this embodiment, the output signals are digital values that represent the amount of current in the sensing electrodes 326A and 326B. However, in other embodiments, the signal measuring units 206A and 206B may be configured to measure other electrical characteristics of the coupling signals, such as voltage.

The signal measuring units 206A and 206B are electrically connected to the processing unit 208, which receives the output signals from the signal measuring units. The processing unit 208 is configured to process the output signals to determine whether an input object, e.g., a finger of a user or any other object having similar electrical properties, is placed on the touch pad 202 and to determine the position of the input object on the touch pad. As an example, the processing unit 208 may be configured to determine the presence of the input object on the touch pad 202 if one or both of the values of the output signals vary from predefined expected values. The processing unit 208 may also be configured to determine the position of the input object on the touch pad 202 by comparing the values of the output signals to reference values, which indicates the most probable absolute position of the input object on the touch pad. These reference values may be empirically derived and stored in the memory 210, which can be any type of a storage device. The processing unit 208 may also be configured to determine the speed of the input object on the touch pad 202 by detecting changes in the position of the input object over time.

In the illustrated embodiment, the processing unit 208 is also electrically connected to the drive circuit 204 to control the drive circuit. Thus, the processing unit 208 is able to direct the drive circuit 204 to generate a drive signal, which is applied to the drive electrode 324 of the touch pad 202 to induce the coupling signals in the sensing electrodes 326A and 326B of the touch pad. However, in other embodiments, another component may control the drive circuit 204.

The processing unit 208 may be a general-purpose digital processor such as a microprocessor or microcontroller. In other embodiments, the processing unit 208 may be a special-purpose processor such as a digital signal processor. In still other embodiments, the processing unit 208 may be another type of controller or a field programmable gate array (FPGA).

In an embodiment, the signal measuring units 206A and 206B, the processing unit 208 and the memory 210 may be integrated into a single integrated circuit (IC). Since only two coupling signals are received by the signal measuring units 206A and 206B, the IC will only require three input pins (one pin for the drive signal), which is significantly fewer, when compared to the pin count of the capacitive sensing IC of a conventional click wheel.

As described above, the touch pad device 100 uses two sensing electrodes to produce two coupling signals, which are used to determine the presence, position and/or speed of an input object on the touch pad 202. However, in other embodiments, the touch pad device 100 may use more than two sensing electrodes. In addition, the touch pad 202 may be configured in other configurations, such as an annular configuration.

Figure 4:
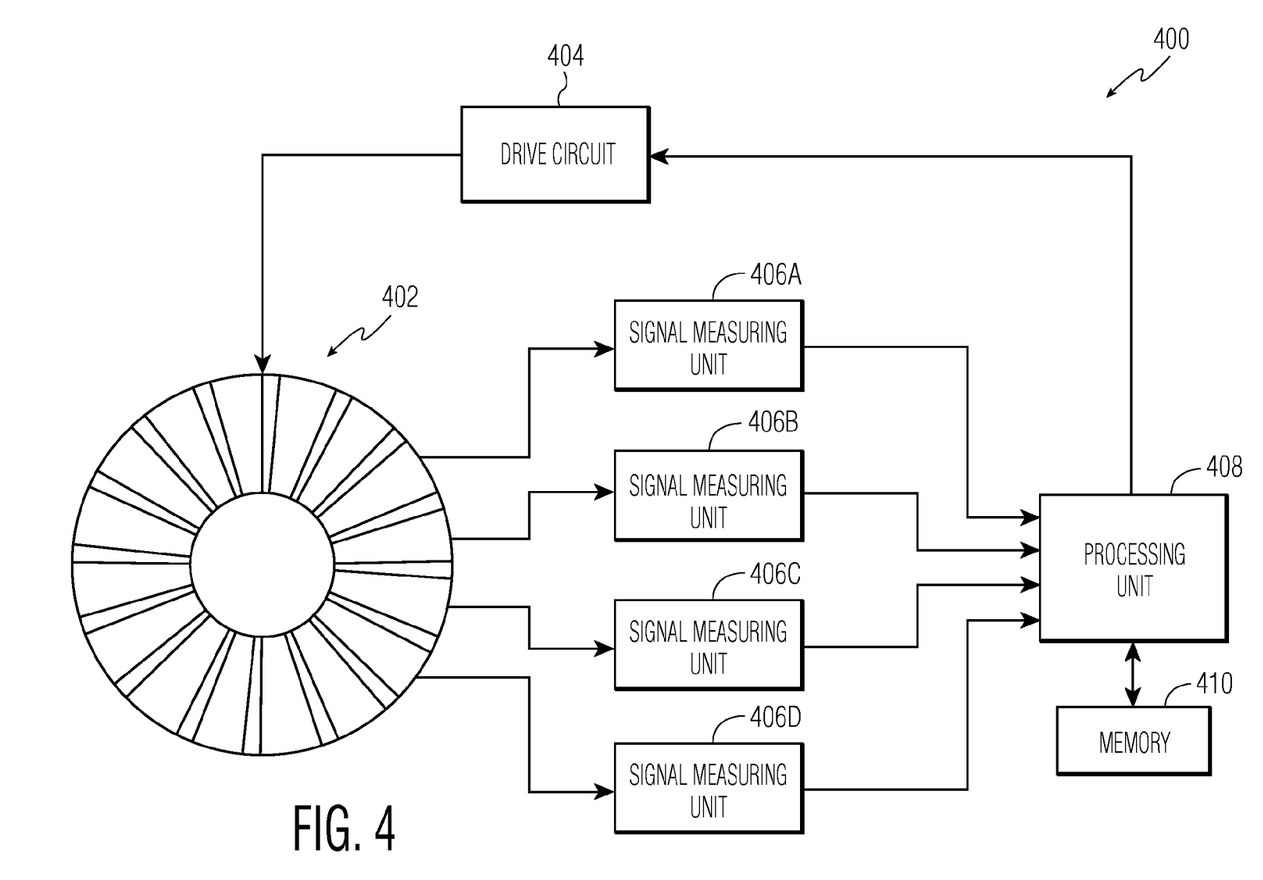
FIG. 4 is a block diagram of a touch pad device in accordance with another embodiment of the invention.

Turning now to FIG. 4, a touch pad device 400 in accordance with another embodiment of the invention is shown. The touch pad device 400 includes a touch pad 402, a drive circuit 404, four signal measuring units 406A, 406B, 406C and 406D, a processing unit 408 and memory 410. Although these components are illustrated in FIG. 4 as being separate components, two or more of these components may be integrated. In this embodiment, the touch pad 402 is configured as an annular touch sensitive device using four sensing electrodes to determine the presence, position and/or speed of an input object, e.g., a finger of a user, on the touch pad.

The annular touch pad 402 is an electronic component that generates signals that vary depending on the position of the input object on the annular touch pad. Thus, the signals from the touch pad 402 can be used to determine the annular position of the input object on the touch pad and/or to determine the speed of the input object pad moving on the touch pad.

Figure 5A:
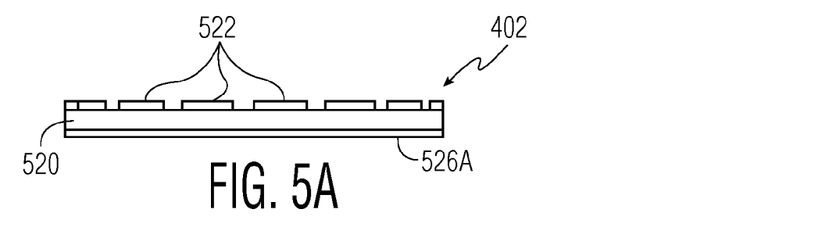
FIG. 5A is a side view of an annular touch pad of the touch pad device of FIG. 4.
Figure 5B:
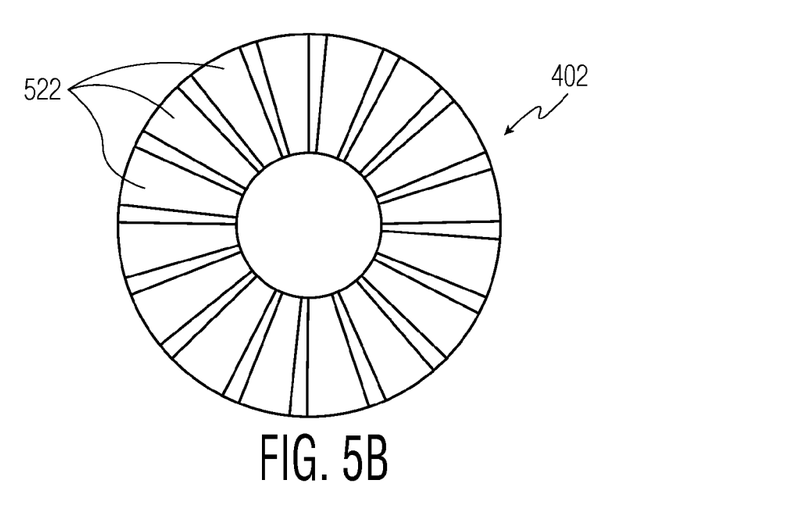
FIG. 5B is a top view of the annular touch pad of the touch pad device of FIG. 4.
Figure 5C:
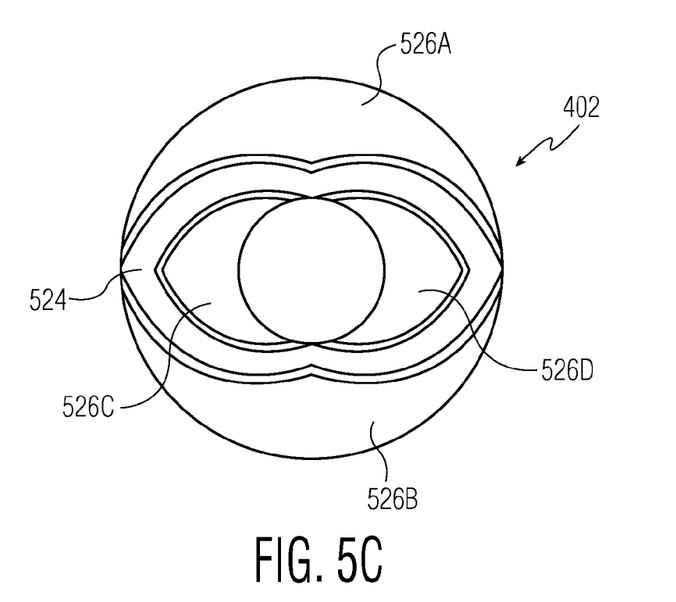
FIG. 5C is a bottom view of the annular touch pad of the touch pad device of FIG. 4.
Figure 5D:
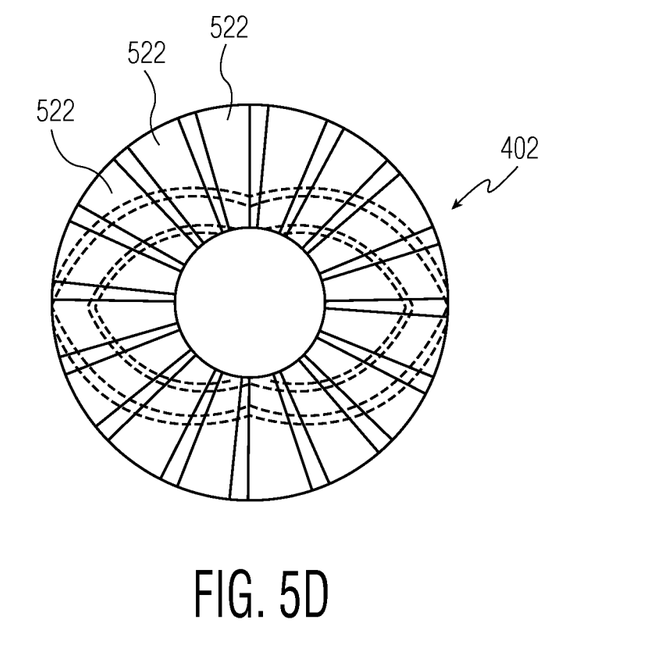
FIG. 5D is another top view of the annular touch pad of the touch pad device of FIG. 2 with superimposed phantom layout of the bottom view of the annular touch pad.

The annular touch pad 402 is further described with reference to FIGS. 5A, 5B, 5C and 5D. FIG. 5A is a side view of the annular touch pad 402. FIG. 5B is a top view of the annular touch pad 402. FIG. 5C is a bottom view of the annular touch pad 202. FIG. 5D is also a top view of the annular touch pad 402 with superimposed phantom layout of the bottom view of the annular touch pad. As shown in FIG. 5A, the annular touch pad 402 includes an annular substrate 520 having an upper top major surface and a lower major surface. The upper and lower major surfaces of the annular substrate 520 are opposing surfaces. The upper major surface of the annular substrate 520 is the surface that faces toward a user, and thus, is the surface that the user electrically contacts with an input object, e.g., a finger, to use the touch pad 402. In some embodiments, the annular substrate 520 may be made of non-conductive material, such as plastic material. In some embodiments, the annular substrate 320 may be made of a flexible non-conductive material, and thus, the touch pad 402 may be a flex circuit.

As shown in FIGS. 5A and 5B, the annular touch pad 402 includes an array of conductors 522 on the top major surface, similar to the array of conductors 322 of the touch pad 202. However, in this embodiment, the conductors 522 are positioned in an annular arrangement such that each of the conductors 522 is radially orientated, i.e., the length of each conductor is radially orientated. The number of conductors 522 included in the annular touch pad 402 may vary. In the illustrated embodiment, each of the conductors 522 is physically and electrically separated from each other by spaces. However, in other embodiments, the conductors 522 may be physically and electrically separated from each other by non-conductive materials disposed between the conductors.

As shown in FIG. 5C, the annular touch pad 402 includes a drive electrode 524 and four sensing electrodes 526A, 526B, 526C and 526D on the lower major surface of the annular substrate 520. In the illustrated embodiment, the drive electrode 524 is shaped as a conductive strip that twice travels from the outer edge of the annular substrate 520 to the inner edge of the annular substrate and back to the outer edge. Thus, the lower major surface of the annular substrate 520 is divided into four regions by the drive electrode 524. These four regions are occupied by the four sensing electrodes 526A, 526B, 526C and 526D, which are configured in similar shapes as the four regions of the annular substrate 520 divided by the drive electrode 524. The sensing electrodes 526A and 526B are positioned between the drive electrode 524 and the outer edge of the annular substrate 520, while the sensing electrodes 526C and 526D are positioned between the drive electrode 524 and the inner edge of the annular substrate. Although the sensing electrodes 526A, 526B, 526C and 526D are illustrated in FIG. 5C as having particular shapes, these sensing electrodes may have different shapes in other embodiments. In the illustrated embodiment, each of the drive and sensing electrodes 524, 526A, 526B, 526C and 526D is physically and electrically separated from each other by spaces. However, in other embodiments, the drive and sensing electrodes 524, 526A, 526B, 526C and 526D may be physically and electrically separated from each other by non-conductive materials disposed between the drive and sensing electrodes.

The relative positions of the conductors 522 on the upper major surface of the annular substrate 520 with respect to the sensing electrodes 526A, 526B, 526C and 526D on the lower major surface of the annular substrate are illustrated in FIG. 5D. The conductors 522 are positioned on the upper major surface such that each of the conductors is situated directly across portions of two of the sensing electrodes 526A, 526B, 526C and 526D on the lower major surface. As shown in FIG. 5D, the sizes of the portions of two sensing electrodes that are situated across a particular conductor depends on the location of that conductor on the upper major surface. Each of the conductors 522 on the upper major surface is associated with different sized portions of two sensing electrodes on the lower major surface.

Figure 6A:
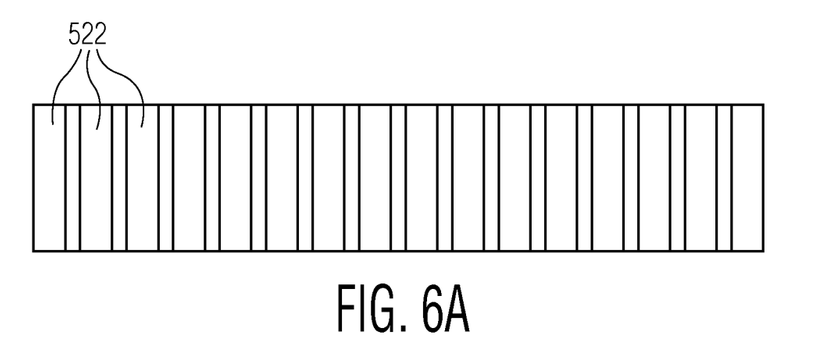
FIG. 6A is a top view of conductors on a rectangular substrate, which shows pre-contorted shapes of the conductors of the annular touch pad.
Figure 6B:
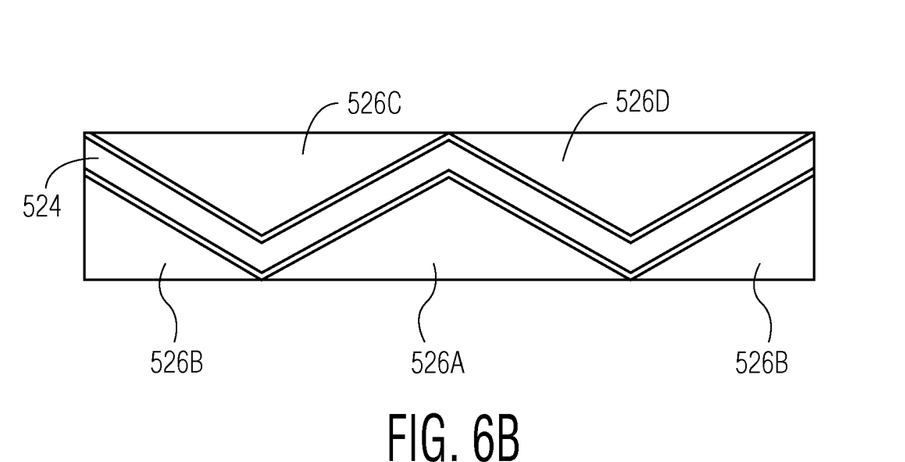
FIG. 6B is a bottom view of drive and sensing electrodes on the rectangular substrate, which shows pre-contorted shapes of the drive and sensing electrodes of the annular touch pad.

The shapes of the conductors 522, the drive electrode 524 and the sensing electrodes 526A, 526B, 526C and 526D of the annular touch pad 402 can be viewed as shapes on a rectangular substrate that have been contorted as the rectangular substrate is bent into an annular shape, such as the annular substrate 520 of the touch pad 402. Pre-contortion shapes of the conductors 522, the drive electrode 524 and the sensing electrodes 526A, 526B, 526C and 526D on a rectangular substrate are illustrated in FIGS. 6A and 6B. As shown in FIG. 6A, the pre-contortion shapes of the conductors 522 are rectangular. As shown in FIG. 6B, the pre-contortion shape of the drive electrode 524 is a W-shaped conductive strip. As also shown in FIG. 6B, the pre-contortion shapes of the sensing electrodes 526A, 526B, 526C and 526D are triangular, or more specifically, in the shapes of isosceles triangles. In FIG. 6B, the sensing electrode 526B is shown to be divided in half. If the rectangular substrate of FIGS. 6A and 6B is bent into an annular shape so that the top edge becomes the inner edge of the annular substrate and the bottom edge becomes outer edge of the annular substrate, the shapes of the conductors 522, the drive electrode 524 and the sensing electrodes 526A, 526B, 526C and 526D will be contorted to the shapes shown in FIGS. 5B and 5C.

Turning back to FIG. 4, the drive circuit 404 of the touch pad device 400 is electrically connected to the drive electrode 524 of the annular touch pad 502. The drive circuit 404 is designed to generate a drive signal, which is applied to the drive electrode 524 to produce coupling effect in the adjacent sensing electrodes 526A, 526B, 526C and 526D through the conductors 522. As a result, a coupling signal is generated in each of the four sensing electrodes 526A, 526B, 526C and 526D. In an embodiment, the drive circuit 404 is configured to generate rectangular wave drive signals, which will typically produce greater coupling in the sensing electrodes 526A, 526B, 526C and 526D. However, in other embodiments, the drive circuit 404 may be configured to generate any type of signals. The coupling signals generated in the four sensing electrodes 526A, 526B, 526C and 526D change when the input object (e.g., a finger of a user) is placed on one or more of the conductors 522 of the annular touch pad 402, which provides a path to ground. Depending on which of the conductors 522 are being touched by the input object, the coupling signals will be changed according to the portions of the sensing electrodes that are situated across those conductors. As an example, coupling-induced currents in the sensing electrodes 526A, 526B, 526C and 526D will decrease when the input object is placed on one or more of the conductors 522 of the annular touch pad 402. Thus, the coupling signals in the sensing electrodes 526A, 526B, 526C and 526D can be used to determine the position of the input object on the annular touch pad.

The signal measuring units 406A, 406B, 406C and 406D are electrically connected to the sensing electrodes 526A, 526B, 526C and 526D, respectively, of the annular touch pad 402. Each of the signal measuring units 406A, 406B, 406C and 406D is designed to measure the coupling signal in the connected sensing electrode and produce an output signal, which is indicative of the strength of the coupling signal. In an embodiment, each of the signal measuring units 406A, 406B, 406C and 406D may include an ADC to measure the coupling-induced current in the connected sensing electrode. In this embodiment, the output signals are digital values that represent the currents in the sensing electrodes 526A, 526B, 526C and 526D. However, in other embodiments, the signal measuring units 406A, 406B, 406C and 406D may be configured to measure other electrical characteristics of the coupling signals, such as voltage.

The signal measuring units 406A, 406B, 406C and 406D are electrically connected to the processing unit 408, which receives the four output signals from the four signal measuring units. The processing unit 408 is configured to process the output signals to determine whether an input object is placed on the annular touch pad 402 and to determine the position of the input object on the touch pad. As an example, the processing unit 408 may be configured to determine the presence of the input object on the annular touch pad 402 if one or more values of the output signals vary from predefined expected values. The processing unit 410 may also be configured to determine the position of the input object on the annular touch pad 402 by comparing the values of the output signals to reference values, which indicates the most probable position of the input object on the annular touch pad. These reference values may be empirically derived and stored in the memory 410, which can be any type of a storage device. The processing unit 408 may also be configured to determine the speed of the input object on the annular touch pad 402 by detecting changes in the position of the input object over time.

In the illustrated embodiment, the processing unit 408 is also electrically connected to the drive circuit 404 to control the drive circuit. Thus, the processing unit 408 is able to direct the drive circuit to generate a drive signal, which is applied to the drive electrode 524 of the annular touch pad 402 to induce the coupling signals in the sensing electrodes 526A, 526B, 526C and 526D of the annular touch pad. However, in other embodiments, another component may control the drive circuit 404.

The processing unit 408 may be a general-purpose digital processor such as a microprocessor or microcontroller. In other embodiments, the processing unit 408 may be a special-purpose processor such as a digital signal processor. In still other embodiments, the processing unit 408 may be another type of controller or a FPGA.

In an embodiment, the signal measuring units 406A, 406B, 406C and 406D, the processing unit 408 and the memory 410 may be integrated into a single IC. Since only four coupling signals are received by the signal measuring units 406A, 406B, 406C and 406D, the IC will only require five input pins (one pin for the drive signal), which is still significantly fewer, when compared to the pin count of the capacitive sensing IC of a conventional click wheel.

Although the annular touch pad 402 of the touch pad device 400 has been illustrated and described as having an annular substrate 520, the substrate 520 of the touch pad 402 may be configured in different shapes in other embodiments. As an example, the substrate 520 may be configured in an annular-like polygonal shape. As another example, the substrate 520 may be configured in a rectangular frame shape or other polygonal frame shapes.

Figure 7:
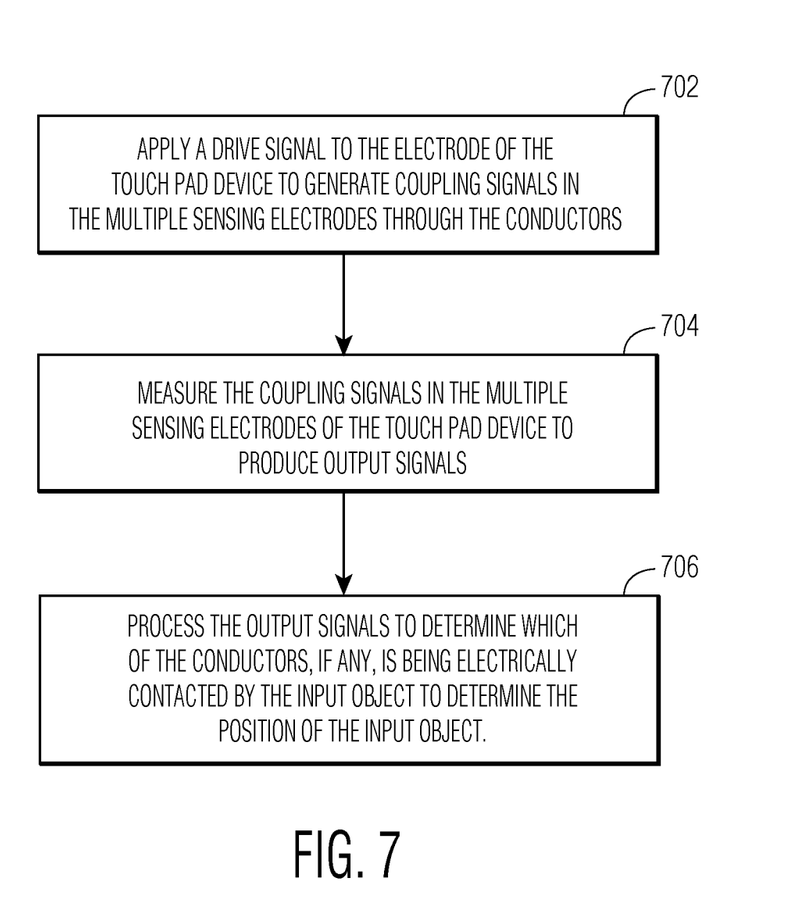
FIG. 7 is a process flow diagram of a method for determining a position of a target object on a touch pad device in accordance with an embodiment of the invention.

A method for determining a position of a target object on a touch pad device in accordance with an embodiment of the invention is described with reference to FIG. 7. The touch pad device includes a substrate having opposing first and second surfaces, a drive conductive electrode and multiple sensing electrodes on the second surface, and a plurality of conductors on the first surface. Each of the conductors is positioned on the first surface such that portions of at least two of the multiple sensing electrodes are directly across that conductor on the second surface. At block 702, a drive signal is applied to the drive electrode of the touch pad device to generate coupling signals in the multiple sensing electrodes through the conductors. Changes in the coupling signals are dependent on any electrical contact between an input object and at least one of the conductors. Next, at block 704, the coupling signals in the multiple sensing electrodes of the touch pad device are measured to produce output signals. Next at block 706, the output signals are processed to determine which of the conductors, if any, is being electrically contacted by the input object to determine the position of the input object.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A touch pad device comprising:
    a substrate having opposing first and second surfaces;
    a drive electrode and multiple sensing electrodes on the second surface, the multiple sensing electrodes including first and second sensing electrodes each substantially in the shape of a right triangle positioned on the second surface such that the first and second sensing electrodes form a rectangular arrangement with the drive electrode being situated diagonally between a hypotenuse of the first sensing electrode and a hypotenuse of the second sensing electrode;
    a plurality of conductors on the first surface, each of the conductors having a rectangular shape with each of the conductors being positioned along a horizontal axis on the first surface such that each of the conductors is respectively situated directly across from a portion of the first sensing electrode, a portion of the second sensing electrode, and a portion of the drive electrode, wherein a size of the respective portions of the first sensing electrode increases in a first direction along the horizontal axis and a size of the respective portions of the second sensing electrode decreases in the first direction along the horizontal axis;
    a drive circuit configured to generate a drive signal, the drive circuit being electrically connected to the drive electrode to supply the drive signal to the drive electrode to generate coupling signals in the multiple sensing electrodes, the coupling signals being dependent on any electrical contact between an input object and at least one of the conductors;
    multiple signal measuring units electrically connected to the multiple sensing electrodes to measure the coupling signals in the multiple sensing electrodes and to produce output signals; and
    a processing unit connected to the multiple signal measuring units to process the output signals to determine which of the conductors is being electrically contacted by the input object to determine a position of the input object;
    wherein the touch pad device is configured such that the drive electrode generates the coupling signals in the multiple sensing electrodes.

2. The touch pad device of claim 1 wherein the substrate is rectangular in shape.

3. The touch pad device of claim 1 wherein each of the multiple signal measuring units includes an analog-to-digital converter to measure current in each of the multiple sensing electrodes.

4. The touch pad device of claim 1 wherein the drive circuit is configured to generate the drive signal in the form of a rectangular wave signal.

5. A method for determining a position of a target object on a touch pad device, the touch pad device including a substrate having opposing first and second surfaces, a drive conductive electrode and multiple sensing electrodes on the second surface, the multiple sensing electrodes including first and second sensing electrodes each substantially in the shape of a right triangle positioned on the second surface such that the first and second sensing electrodes form a rectangular arrangement with the drive electrode being situated diagonally between a hypotenuse of the first sensing electrode and a hypotenuse of the second sensing electrode, and a plurality of conductors on the first surface, each of the conductors having a rectangular shape with each of the conductors being positioned on the first surface such that each of the conductors is respectively situated directly across from a portion of the first sensing electrode, a portion of the second sensing electrode, and a portion of the drive electrode, wherein a size of the respective portions of the first sensing electrode increases in a first direction along the horizontal axis and a size of the respective portions of the second sensing electrode decreases in the first direction along the horizontal axis, the method comprising:

applying a drive signal to the drive electrode of the touch pad device to generate coupling signals in the multiple sensing electrodes, the coupling signals being dependent on any electrical contact between an input object and at least one of the conductors;

measuring the coupling signals in the multiple sensing electrodes of the touch pad device to produce output signals; and     processing the output signals to determine which of the conductors is being electrically contacted by the input object to determine the position of the input object.

6. The method of claim 5 wherein the applying the drive signal includes applying a rectangular wave drive signal to the drive electrode of the touch pad device to generate the coupling signals in the multiple sensing electrodes.

7. The method of claim 5 wherein the measuring the coupling signals in the multiple sensing electrodes of the touch pad device includes performing analog-to-digital conversion to measure current in each of the multiple sensing electrodes to produce the output signals.

8. The method of claim 5 wherein the substrate is rectangular in shape.

\* \* \* \* \*